United States Patent
Akatsuka (10) Patent No.: US 12,503,093 B2
(45) Date of Patent: Dec. 23, 2025

(54) PRIORITY CONTROL BASED ON AT LEAST ONE OF LIFTING HEIGHT, WEIGHT, AND EMPTY DRIVER SEAT

(71) Applicant: KABUSHIKI KAISHA TOYOTA JIDOSHOKKI, Kariya (JP)

(72) Inventor: Keisuke Akatsuka, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 32 days.

(21) Appl. No.: 18/587,439

(22) Filed: Feb. 26, 2024

(65) Prior Publication Data
US 2024/0286591 A1 Aug. 29, 2024

(30) Foreign Application Priority Data
Feb. 28, 2023 (JP) .................. 2023-030276

(51) Int. Cl.
*B60W 30/09* (2012.01)
*B60T 7/22* (2006.01)
(Continued)

(52) U.S. Cl.
CPC .................. *B60T 8/58* (2013.01); *B60T 7/22* (2013.01); *B60T 8/1701* (2013.01); *B66F 9/07509* (2013.01); *B60T 2201/022* (2013.01); *B60T 2210/32* (2013.01); *B60T 2220/04* (2013.01); *B60T 2250/00* (2013.01); *B60T 2250/02* (2013.01); *B60W 30/09* (2013.01)

(58) Field of Classification Search
CPC ...... B66F 17/003; B66F 9/24; B66F 9/07509; B60W 2300/121; B60W 30/09; B60T 8/58; B60T 8/1701; B60T 7/22; B60T 2201/022; B60T 2210/32; B60T 2220/04; B60T 2250/00; B60T 2250/02
See application file for complete search history.

(56) References Cited

U.S. PATENT DOCUMENTS 5,899,284 A * 5/1999 Reimers ................ B62B 5/0026
280/DIG. 6
7,568,547 B2 * 8/2009 Yamada .............. B66F 9/07572
180/282

(Continued)

FOREIGN PATENT DOCUMENTS

JP 2021-93124 A 6/2021

*Primary Examiner* — Gonzalo Laguarda
(74) *Attorney, Agent, or Firm* — Sughrue Mion, PLLC (57) ABSTRACT

An industrial vehicle includes a controller. The controller sets a first upper deceleration limit as a set upper deceleration limit, if a first condition is satisfied, to perform first deceleration limiting. The first condition is satisfied when at least one of a high lifting height of the industrial vehicle, a material weight equal to or greater than a threshold, and an empty driver seat is detected. The controller sets a second upper deceleration limit as the set upper deceleration limit, if a second condition is satisfied, to perform second deceleration limiting. The second condition is satisfied when a distance between the industrial vehicle and an obstacle is less than a threshold. The controller performs priority control if the first condition and the second condition are satisfied so that the first upper deceleration limit is set as the set upper deceleration limit in preference to the second upper deceleration limit.

5 Claims, 5 Drawing Sheets

(51) Int. Cl.
   *B60T 8/17*     (2006.01)
   *B60T 8/58*     (2006.01)
   *B66F 9/075*    (2006.01)

(56) References Cited

U.S. PATENT DOCUMENTS

| | | | |
|---|---|---|---|
| 11,952,247 B1* | 4/2024 | Dwyer | B60W 10/04 |
| 12,180,047 B2* | 12/2024 | Kubotani | B66F 9/07572 |
| 12,221,032 B2* | 2/2025 | Kubotani | B60Q 1/26 |
| 2021/0009116 A1* | 1/2021 | Fujiyoshi | E02F 9/262 |
| 2022/0411246 A1* | 12/2022 | Kubotani | B66F 17/003 |
| 2023/0229178 A1* | 7/2023 | Kubotani | G05D 13/66 |
| | | | 701/93 |

* cited by examiner

PRIORITY CONTROL BASED ON AT LEAST ONE OF LIFTING HEIGHT, WEIGHT, AND EMPTY DRIVER SEAT

CROSS-REFERENCE TO RELATED APPLICATION

This application claims priority to Japanese Patent Application No. 2023-030276 filed on Feb. 28, 2023, the entire disclosure of which is incorporated herein by reference.

The present disclosure relates to an industrial vehicle.

BACKGROUND ART

Japanese Patent Application Publication No. 2021-093124 discloses an industrial vehicle that includes an obstacle detector and a controller. The obstacle detector is configured to detect a position of an obstacle relative to the industrial vehicle. The controller performs vehicle speed limiting of the industrial vehicle based on a detection result of the obstacle detector. The controller performs deceleration limiting of the industrial vehicle along with vehicle speed limiting. The controller performs control so that the deceleration of the industrial vehicle is equal to or lower than an upper deceleration limit.

The deceleration of the industrial vehicle may be limited in various ways according to circumstances of the industrial vehicle. Accordingly, different upper deceleration limits may be set for each deceleration limiting. If some conditions for deceleration limiting are satisfied at the same time, the various deceleration limiting may interfere with each other.

The present disclosure, which has been made in light of the above described problem, is directed to providing an industrial vehicle that prevents an interference between a first deceleration limiting and a second deceleration limiting.

SUMMARY

In accordance with an aspect of the present disclosure, there is provided an industrial vehicle includes a controller and an obstacle detector. The controller is configured to decelerate the industrial vehicle at a deceleration equal to or lower than a set upper deceleration limit. The obstacle detector configured to detect a relative distance between the industrial vehicle and an obstacle. The controller sets a first upper deceleration limit as the set upper deceleration limit, if a first condition is satisfied, to perform first deceleration limiting. The first condition is satisfied when at least one of a high lifting height of the industrial vehicle equal to or greater than a lifting height threshold, a weight of a material equal to or greater than a weight threshold, and an empty driver seat is detected. The controller sets a second upper deceleration limit as the set upper deceleration limit, if a second condition is satisfied, to perform second deceleration limiting. The second condition is satisfied when the relative distance between the industrial vehicle and the obstacle is less than a predetermined distance threshold. The controller performs priority control if both the first condition and the second condition are satisfied so that the first upper deceleration limit is set as the set upper deceleration limit in preference to the second upper deceleration limit.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an industrial vehicle according to an embodiment.

Forklift Truck

Figure 1:
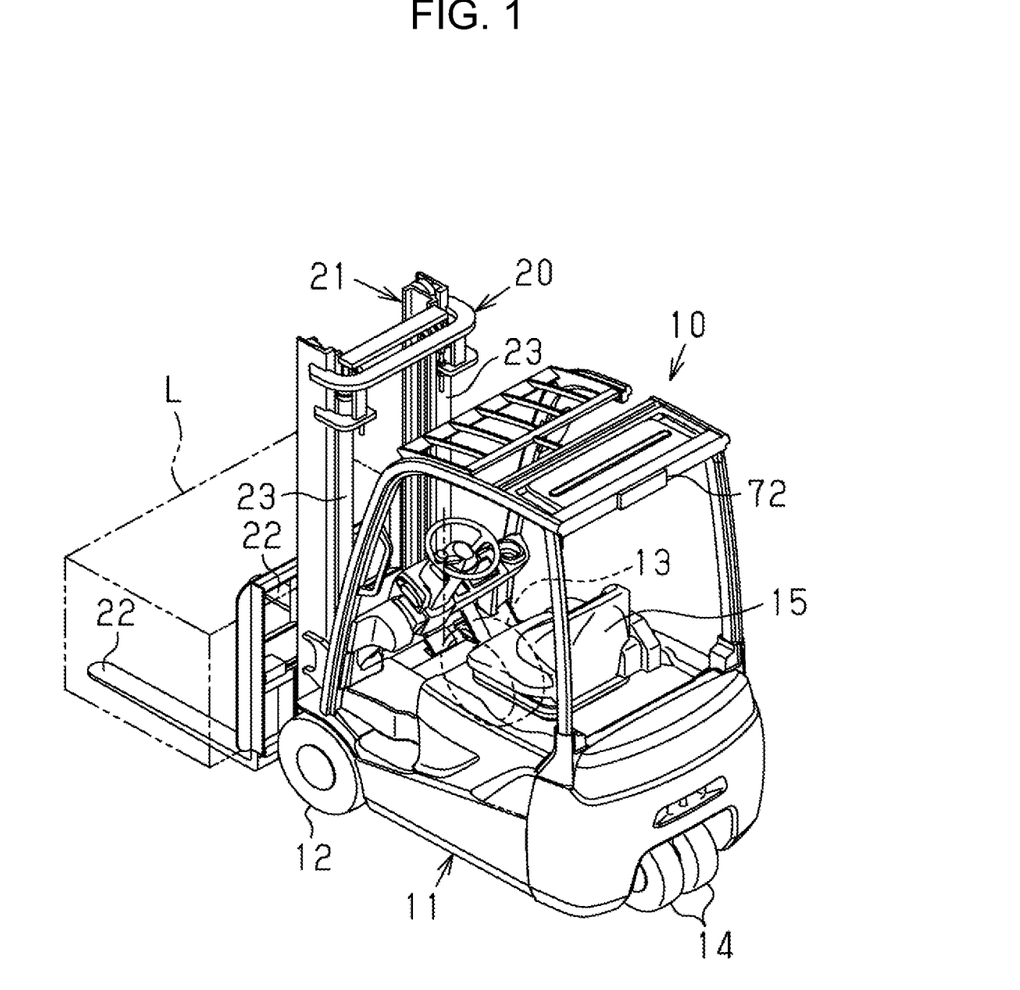
FIG. 1 is a perspective view of a forklift truck.

As illustrated in FIG. 1, a forklift truck 10 includes a vehicle body 11, a drive wheel 12 and a drive wheel 13, two steered wheels 14, and a material handling device 20. The two drive wheels 12 and 13 are separated from each other in a vehicle width direction of the forklift truck 10. The two steered wheels 14 are arranged adjacent to each other in the vehicle width direction. The two steered wheels 14 are arranged at an intermediate position between the drive wheel 12 and the drive wheel 13 in the vehicle width direction. When the two steered wheels 14 adjacently arranged cooperate to serve as a single steered wheel 14, the forklift truck 10 may be regarded as a three-wheeled forklift truck. The forklift truck 10 includes a driver seat 15. The forklift truck 10 is operated by an operator seated in the driver seat 15. Directions, such as front, rear, right, and left, mentioned in the following description indicate directions of the forklift truck 10. The forklift truck 10 serves as an industrial vehicle of the present disclosure.

The material handling device 20 includes a mast 21. The mast 21 is disposed at a front portion of the vehicle body 11. The material handling device 20 includes two forks 22. A material or a load L is loaded on the forks 22. The forks 22 are movable up and down along the mast 21. The material handling device 20 includes a lift cylinder 23. The lift cylinder 23 is a hydraulic cylinder. The forks 22 is moved up and down by extension and contraction of the lift cylinder 23.

Figure 2:
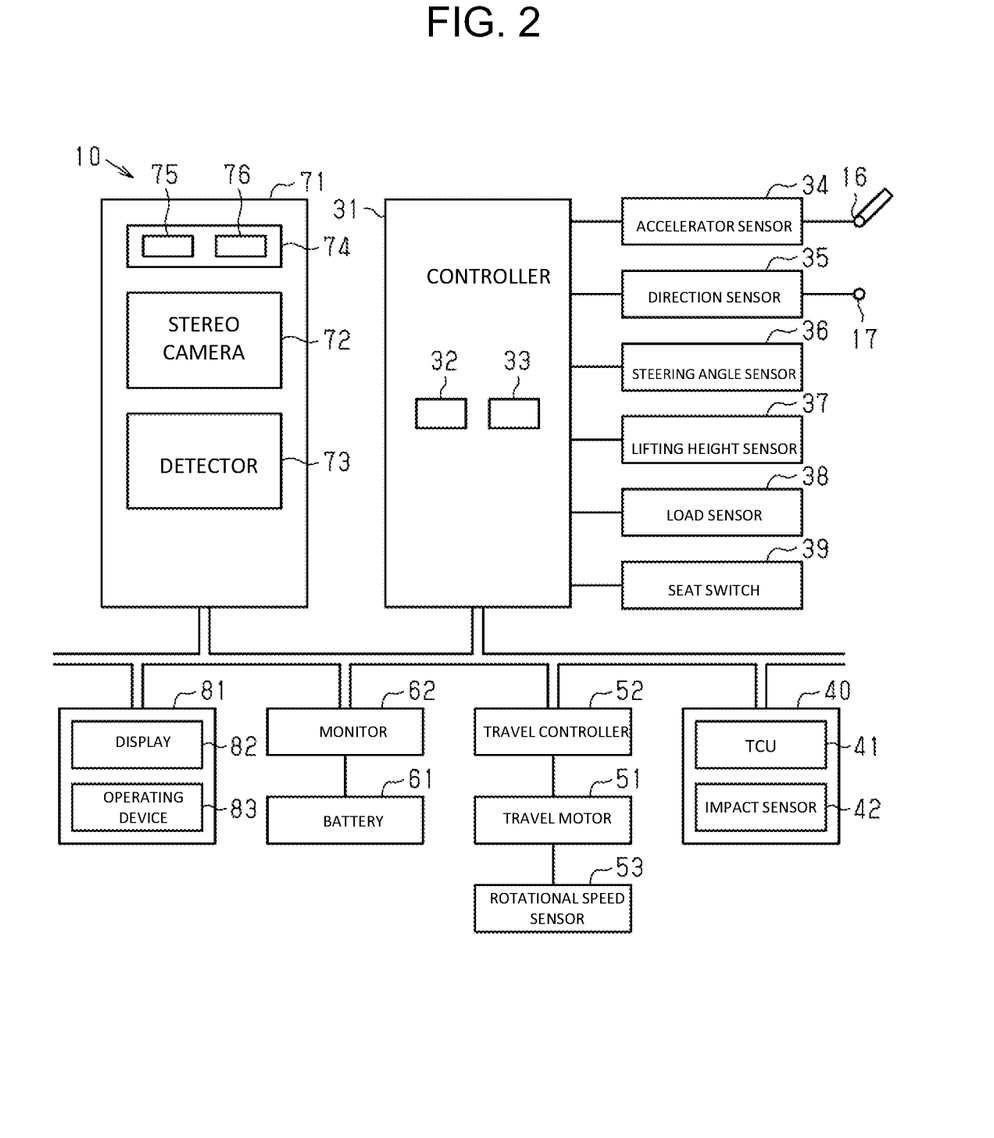
FIG. 2 is a schematic configuration diagram of the forklift truck of FIG. 1.

As illustrated in FIG. 2, the forklift truck 10 includes a controller 31. The controller 31 includes a processor 32 and a memory 33. The processor 32 is, for example, a central processing unit (CPU), a graphics processing unit (GPU), or a digital signal processor (DSP). The memory 33 includes a random access memory (RAM) and a read only memory (ROM). The memory 33 stores various programs for operating the forklift truck 10. The memory 33 stores program codes or commands configured to cause the processor 32 to execute processes. The memory 33, i.e., a computer-readable medium including a non-transitory computer-readable storage medium, includes any media accessible by general or dedicated computers. The controller 31 may include a hardware circuit, such as an application specific integrated circuit (ASIC) or a field programmable gate array (FPGA). The controller 31, which is a processing circuit, may include one or more processors that operate according to computer programs, one or more hardware circuits, such as the ASIC or the FPGA, or a combination thereof.

The forklift truck 10 includes an accelerator pedal 16. The accelerator pedal 16 is operated by the operator on the forklift truck 10.

The forklift truck 10 includes an accelerator sensor 34. The accelerator sensor 34 detects an operation amount of the accelerator pedal 16. The accelerator sensor 34 outputs an electric signal corresponding to the operation amount of the accelerator pedal 16 to the controller 31. Accordingly, the controller 31 detects the operation amount of the accelerator pedal 16 based on the electric signal from the accelerator sensor 34.

The forklift truck 10 includes a direction operation member 17. The direction operation member 17 is, for example, a lever. The direction operation member 17 is configured to tilt forward or rearward from a neutral position.

The forklift truck 10 includes a direction sensor 35. The direction sensor 35 detects an operating direction in which the direction operation member 17 is operated. The direction sensor 35 outputs, to the controller 31, an electric signal corresponding to the operating direction of the direction operation member 17. The controller 31 detects the operating direction of the direction operation member 17 based on the electric signal from the direction sensor 35.

The forklift truck 10 includes a steering angle sensor 36. The steering angle sensor 36 detects a steering angle of the steered wheel 14. The steering angle sensor 36 outputs an electric signal corresponding to the steering angle to the controller 31. The controller 31 detects the steering angle based on the electric signal from the steering angle sensor 36.

The forklift truck 10 includes a lifting height sensor 37. The lifting height sensor 37 detects the lifting height of the material handling device 20 (i.e., the lifting height of the forklift truck 10) to allow the controller 31 to determine whether the lifting height of the material handling device 20 is high or low (i.e., the high lifting height or the low lifting height). The lifting height of the material handling device 20 is a height from the road surface to the forks 22. When the lifting height of the material handling device 20 is less than a predetermined lifting height threshold, the controller 31 determines that the lifting height of the material handling device 20 is low. When the lifting height of the material handling device 20 is equal to or greater than the predetermined lifting height threshold, the controller 31 determines that the lifting height of the material handling device 20 is high. The lifting height threshold may be set arbitrarily. The lifting height sensor 37 is, for example, a switch that is turned on or off when the lifting height of the material handling device 20 reaches the predetermined lifting height threshold. The lifting height sensor 37 may be configured to detect a numerical value of the lifting height of the material handling device 20. The lifting height sensor 37 outputs an electric signal corresponding to the lifting height of the material handling device 20 to the controller 31. Accordingly, the controller 31 detects based on the electric signal from the lifting height sensor 37 whether the lifting height of the material handling device 20 is high or low.

The forklift truck 10 includes a load sensor 38. The load sensor 38 outputs an electric signal corresponding to the weight of the material L loaded on the forks 22 to the controller 31. The load sensor 38 is, for example, a pressure sensor that detects the pressure in the lift cylinder 23. The controller 31 detects the weight of the material L based on the electric signal from the load sensor 38. A weight threshold may be set for the weight of the material L.

The forklift truck 10 includes a seat switch 39. The seat switch 39 is turned on or off depending on whether or not the operator is seated in the driver seat 15, for example. When the operator is seated in the driver seat 15, the seat switch 39 is turned on. When the driver seat 15 is empty, the seat switch 39 is turned off. The seat switch 39 needs to at least allow the controller 31 to determine whether or not the operator is seated in the driver seat 15, and may be a pressure sensor, for example. The seat switch 39 outputs an electric signal corresponding to a seated condition of the driver seat 15 to the controller 31. Accordingly, the controller 31 detects based on the electric signal from the seat switch 39 whether or not the operator is seated in the driver seat 15.

The forklift truck 10 includes a telematics terminal 40. The telematics terminal 40 is a terminal for communicating with external devices via a communication network.

The telematics terminal 40 includes a telematics control unit (TCU) 41. The TCU 41 controls the telematics terminal 40. The TCU 41 may have a hardware configuration similar to that of the controller 31, for example.

The telematics terminal 40 includes an impact sensor 42. The impact sensor 42 detects the magnitude of an impact applied to the telematics terminal 40. The impact sensor 42 outputs an electric signal corresponding to the magnitude of the impact applied to the telematics terminal 40 to the TCU 41. The impact sensor 42 is, for example, an acceleration sensor. The TCU 41 detects the magnitude of the impact applied to the telematics terminal 40 based on the electric signal from the impact sensor 42.

The forklift truck 10 includes a travel motor 51. Driving the travel motor 51 rotates the drive wheels 12 and 13, thereby causing the forklift truck 10 to travel. The travel motor 51 is provided for each of the drive wheels 12 and 13.

The forklift truck 10 includes a travel controller 52. The travel controller 52 is a motor driver that controls the rotational speed of the travel motor 51.

The forklift truck 10 includes a rotational speed sensor 53. The rotational speed sensor 53 detects a rotational speed of the travel motor 51. The rotational speed sensor 53 is, for example, a rotary encoder. The rotational speed sensor 53 outputs an electric signal corresponding to the rotational speed of the travel motor 51 to the travel controller 52. The travel controller 52 detects the rotational speed of the travel motor 51 based on the electric signal from the rotational speed sensor 53.

The forklift truck 10 includes a battery 61. The battery 61 is a power source for at least one of the travel motor 51 and electrical components. The battery 61 is a rechargeable and dischargeable secondary battery. The battery 61 is, for example, a lithium ion secondary battery. In the present specification, "at least one" means "one or more". In one example, if there are two desirable options, "at least one of the options" means "one of the two options" or "both of the two options". In another example, if there are three or more desirable options, "at least one of the options" means "one of the options" or "a combination of any two or more options".

The forklift truck 10 includes a monitor 62. The monitor 62 monitors the battery 61. The monitor 62 is, for example, a battery management system. The target of the monitoring includes at least one of the charging rate of the battery 61 and a failure of the battery 61, for example. The failure of the battery 61 includes overdischarge of the battery 61 and overcharge of the battery 61.

The forklift truck 10 includes an obstacle detector 71. The obstacle detector 71 detects a position of an obstacle. The obstacle detector 71 includes a stereo camera 72. The stereo camera 72 includes two cameras. Each of the two cameras captures images. The stereo camera 72 is arranged on the forklift truck 10 so as to have a bird's-eye view of the road surface on which the forklift truck 10 travels. The stereo camera 72 according to the present embodiment captures images of a view behind the forklift truck 10. Accordingly, the obstacle detector 71 detects obstacles located behind the forklift truck 10. The stereo camera 72 may be arranged so as to capture images of a view in front of the forklift truck 10. In this arrangement, the obstacle detector 71 detects obstacles located in front of the forklift truck 10.

The obstacle detector 71 includes a detector 73. The detector 73 has a hardware configuration similar to that of the controller 31, for example.

The detector 73 (i.e., the obstacle detector) repeatedly performs obstacle detection control, described later, at a predetermined control cycle to detect a relative distance between the forklift truck 10 and an obstacle located behind the forklift truck 10.

Obstacle Detection Control

Figure 3:
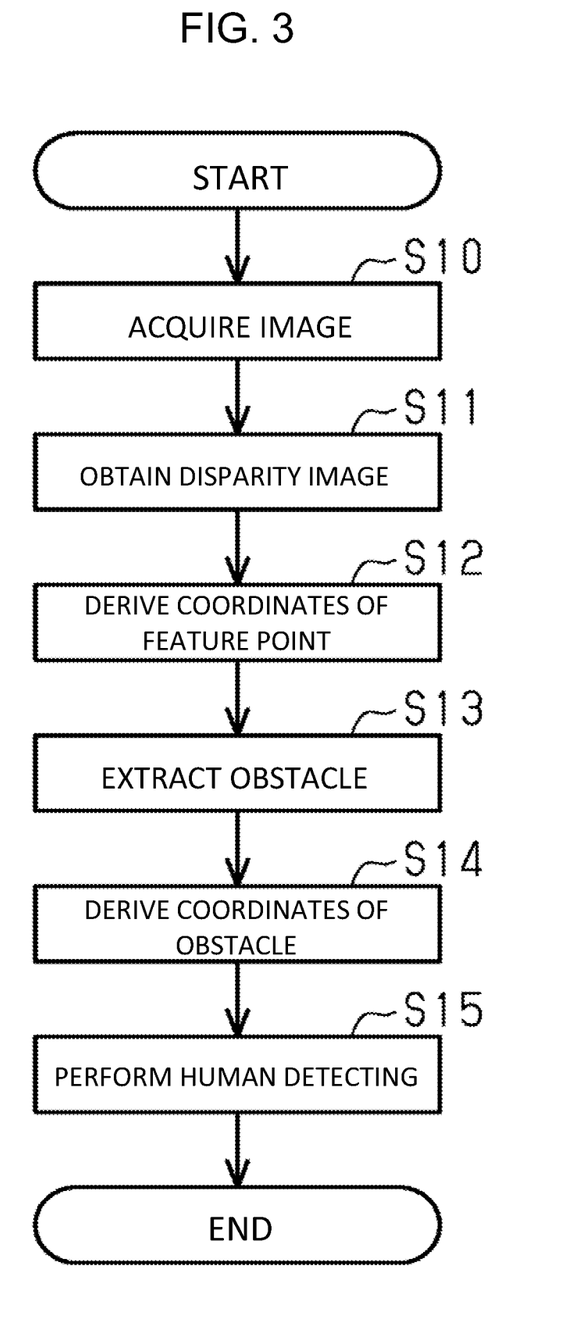
FIG. 3 is a flowchart showing obstacle detection control performed by a detector in FIG. 2.

As illustrated in FIG. 3, the detector 73 acquires an image from the stereo camera 72 at step S10.

The detector 73 performs stereo imaging at step S11 to obtain a disparity image. The disparity image is an image provided with disparity value [px] at each pixel.

The detector 73 derives coordinates of feature points in a world coordinate system, which is a coordinate system in a real space, at step S12. The world coordinate system includes an X-axis extending in the horizontal direction and in a vehicle width direction of the forklift truck 10, a Y-axis extending in the horizontal direction and orthogonal to the X-axis, and a Z-axis extending in the vertical direction in a state where the forklift truck 10 is on a horizontal plane. The detector 73 derives the coordinates of the feature points in the camera coordinate system based on the baseline length of the stereo camera 72, the focal length of the stereo camera 72, and the disparity image obtained at step S11. The stereo camera 72 serves as the origin of the camera coordinate system. The detector 73 performs coordinate transformation of the feature points from the camera coordinate system to the world coordinate system.

The detector 73 clusters the feature points so as to extract obstacles at step S13. Specifically, the detector 73 clusters a set of feature points, which are assumed to represent the same obstacle as one point group, and extracts the point group as an obstacle. At step S13, the feature points are clustered in various ways. The obstacle is a person or an object excluding humans.

The detector 73 derives the coordinates of the obstacles in the world coordinate system at step S14. The coordinates of the obstacles may be derived from the coordinates of the feature points in the same clusters. The coordinates of the obstacles in the world coordinate system represent the positions of the obstacles relative to the forklift truck 10. Specifically, the X coordinate of each of the obstacles represents the distance from the origin to the obstacle in the vehicle width (right-left) direction of the forklift truck 10. The Y coordinate of the obstacle represents the distance from the origin to the obstacle in the front-rear direction of the forklift truck 10. For example, the X and Y coordinates of the origin of the world coordinate system represent the position of the stereo camera 72, and the Z coordinate of the origin of the world coordinate system represents the road surface. The Euclidean distance from the position of the stereo camera 72 to the obstacle may be derived from the X and Y coordinates of the obstacle. The Z coordinate of the obstacle in the world coordinate system represents the height of the obstacle from the road surface.

The detector 73 then performs human detecting at step S15. The human detecting is a processing to determine whether or not the obstacle is a person. In the present embodiment, the detector 73 performs human detecting with an image captured by one of the two cameras of the stereo camera 72. The detector 73 converts the coordinates of the obstacle in the world coordinate system obtained at step S14 into camera coordinates, and converts the camera coordinates of the obstacle into image coordinates of the image captured by the camera. The detector 73 performs human detecting with the image coordinates of the obstacle. The human detecting uses features, for example. The detector 73 extracts the features of the coordinates of the obstacle in the image. The features are histogram of oriented gradients (HOG) features or Haar-like features, for example. The detector 73 compares the features extracted from the image with a data dictionary to determine whether or not the obstacle is a person. The data dictionary is, for example, data of features extracted from the images showing a person. The obstacle that is not determined as a person at step S15 is an object.

As illustrated in FIG. 2, the obstacle detector 71 includes an alarm 74. The alarm 74 is a device that alerts the operator of the forklift truck 10. The alarm 74 includes a buzzer 75 that emits an audible alarm, and a lamp 76 that emits an optical alarm.

The forklift truck 10 includes a display unit 81. The display unit 81 includes a display 82. The display 82 is disposed at a position visible to the operator. The display unit 81 includes an operating device 83. The operating device 83 is disposed at a position where the operating device 83 is operable to the operator of the forklift truck 10, for example. The operating device 83 may be a physical button, or a touch panel. The operating device 83 is operated, for example, to change indications displayed on the display 82 or change setting values of the forklift truck 10.

Control by Controller

The controller 31, the TCU 41, the travel controller 52, the monitor 62, and the detector 73 are configured to acquire information from each other. The controller 31, the TCU 41, the travel controller 52, the monitor 62, and the detector 73 communicate with each other according to vehicle communication protocols, such as a controller area network (CAN) or a local interconnect network (LIN), to acquire information.

The controller 31 derives the vehicle speed [km/h] of the forklift truck 10. The vehicle speed of the forklift truck 10 is derived from the rotational speed and rotational direction of the travel motor 51 provided for each of the drive wheels 12 and 13, the gear ratio, the outer diameters of the drive wheels 12 and 13, the steering angle detected by the steering angle sensor 36, and the like. The rotational speed and rotational direction of the travel motor 51 may be obtained from the travel controller 52. The gear ratio and the outer diameters of the drive wheels 12 and 13 may be stored in the memory 33 in advance. The controller 31 may derive the traveling direction of the forklift truck 10. The traveling direction of the forklift truck 10 consists of a forward direction and a backward direction.

The controller 31 activates the alarm 74 by transmitting an alert command to the obstacle detector 71. Specifically, the obstacle detector 71 includes an activation device that activates the alarm 74 upon receiving an alarm command.

Vehicle Speed Control Performed by Controller

The controller 31 calculates a target vehicle speed from a detection result of the accelerator sensor 34. The controller 31 calculates a target rotational speed from the target vehicle speed. The target rotational speed is a rotational speed for causing the forklift truck 10 to reach the target vehicle speed. The controller 31 generates a command including information about the target rotational speed. The controller 31 outputs this command to the travel controller 52. The travel controller 52 controls the travel motor 51 so as to follow the target rotational speed according to the command. This causes the forklift truck 10 to travel following the target vehicle speed.

The controller 31 limits a vehicle speed of the forklift truck 10. For example, the controller 31 sets an upper vehicle speed limit [km/h] to perform vehicle speed limiting of the forklift truck 10. The upper vehicle speed limit has a value lower than the maximum speed that the forklift truck 10 can reach. When the target vehicle speed calculated from the detection result of the accelerator sensor 34 is lower than the upper vehicle speed limit, the controller 31 calculates the target rotational speed from the target vehicle speed. When the target vehicle speed calculated from the detection result of the accelerator sensor 34 is equal to or higher than the upper vehicle speed limit, the controller 31 calculates the target rotational speed from the upper vehicle speed limit instead of the target vehicle speed. This suppresses the speed of the forklift truck 10 from exceeding the upper vehicle speed limit.

The controller 31 performs deceleration limiting when the forklift truck 10 is decelerated along with vehicle speed limiting. The controller 31 sets an upper deceleration limit [m/s^2] to perform deceleration limiting. The upper deceleration limit has a value lower than the maximum deceleration that the forklift truck 10 can reach. The controller 31 performs control so that the deceleration of the forklift truck 10 does not exceed the upper deceleration limit. For example, the controller 31 outputs a command instructing a target deceleration to the travel controller 52. The travel controller 52 controls the rotational speed of the travel motor 51 so that the deceleration of the forklift truck 10 becomes the target deceleration. The controller 31 outputs a value equal to or lower than the set upper deceleration limit as the target deceleration to the travel controller 52. This suppresses the deceleration of the forklift truck 10 from exceeding the upper deceleration limit. That is, the controller 31 is configured to decelerate the industrial vehicle at a deceleration equal to or lower than the set upper deceleration limit.

The controller 31 performs vehicle speed limiting and deceleration limiting based on the condition of the forklift truck 10. The upper vehicle speed limit set for vehicle speed limiting and the upper deceleration limit set for deceleration limiting may depend on the condition of the forklift truck 10. The following will describe vehicle speed limiting and deceleration limiting that are performed based on the condition of the forklift truck 10.

Vehicle Speed Limiting and Deceleration Limiting Based on Condition of Material Handling Device The following will describe vehicle speed limiting and deceleration limiting performed based on the condition of the material handling device 20. The controller 31 performs vehicle speed limiting and deceleration limiting of the forklift truck 10 based on at least one of the lifting height of the material handling device 20 and the weight of the material L. According to the present embodiment, the controller 31 performs vehicle speed limiting and deceleration limiting based on the detected lifting height of the material handling device 20 and the weight of the material L. When the lifting height of the material handling device 20 is high, the controller 31 performs vehicle speed limiting based on the weight of the material L. The controller 31 decreases the upper vehicle speed limit as the weight of the material L increases when the high lifting height of the material handling device 20 is detected. The controller 31 may decrease the upper vehicle speed limit continuously or in stages as the weight of the material L increases.

The controller 31 decreases the upper deceleration limit as the weight of the material L increases when the lifting height of the material handling device 20 is high (i.e., the high lifting height of the industrial vehicle equal to or greater than the lifting height threshold is detected). The controller 31 may decrease the upper deceleration limit continuously or in stages as the weight of the material L increases. An upper deceleration limit setting condition on the lifting height of the forklift truck 10, the weight of the material L, and the condition of the driver seat 15 is defined as a first condition. The first condition is satisfied when at least one of the high lifting height of the forklift truck 10, the weight of the material L equal to or greater than the weight threshold, and the empty driver seat is detected.

The first condition for deceleration limiting performed based on the condition of the material handling device 20 is defined as a material handling-related condition. Deceleration limiting performed based on the condition of the material handling device 20 serves as the first deceleration limiting of the present disclosure. The upper deceleration limit set for deceleration limiting performed based on the condition of the material handling device 20 serves as a material handling-related upper deceleration limit. The material handling-related upper deceleration limit serves as the first upper deceleration limit of the present disclosure.

The material handling-related upper deceleration limit may depend on whether the forklift truck 10 is traveling straight or turning. Traveling straight or turning of the forklift truck 10 may be detected from the steering angle. The controller 31 may decrease the material handling-related upper deceleration limit when the forklift truck 10 is turning than the material handling-related upper deceleration limit when the forklift truck 10 is traveling straight. The controller 31 may decrease the material handling-related upper deceleration limit as the turning radius of the forklift truck 10 decreases.

The weight threshold may be set for the weight of the material L. The controller 31 may perform vehicle speed limiting and deceleration limiting when the high lifting height of the material handling device 20 and the weight of the material L equal to or greater than the weight threshold are detected. In this case, the material handling-related condition is satisfied when the high lifting height of the material handling device 20 and the weight of the material L equal to or greater than the weight threshold are detected.

Vehicle Speed Limiting and Deceleration Limiting when Driver Seat is Empty

The following will describe vehicle speed limiting and deceleration limiting performed when the driver seat is empty. When the seat switch 39 detects that the operator is not seated in the driver seat 15 (i.e., an empty driver seat is detected), the controller 31 performs vehicle speed limiting and deceleration limiting. When an empty driver seat is detected, the first condition is satisfied. The first condition for deceleration limiting performed when an empty driver seat is detected is defined as a driver seat-related condition. Deceleration limiting performed when an empty driver seat is detected serves as the first deceleration limiting of the present disclosure. The upper deceleration limit set for deceleration limiting performed when an empty driver seat is detected serves as an empty seat-related upper deceleration limit. The empty seat-related upper deceleration limit serves as the first upper deceleration limit of the present disclosure.

Vehicle Speed Limiting and Deceleration Limiting when Obstacle is Detected

The following will describe vehicle speed limiting and deceleration limiting performed when an obstacle is detected. The controller 31 detects the position of the obstacle from a detection result of the detector 73. An upper deceleration limit setting condition on the distance between the forklift truck 10 and an obstacle is defined as a second condition. The controller 31 performs vehicle speed limiting and deceleration limiting if the second condition is satisfied, wherein the second condition is satisfied when the relative distance between the forklift truck 10 and the obstacle is less than a predetermined distance threshold. For example, an area rearward from the forklift truck 10 may be defined as the distance threshold. In this case, if the obstacle is located in this area, the relative distance between the forklift truck 10 and the obstacle is less than the distance threshold. Accordingly, if the obstacle is located in the area, the controller 31 performs vehicle speed limiting and deceleration limiting. The controller 31 may decrease the upper vehicle speed limit and the upper deceleration limit as the distance between the forklift truck 10 and the obstacle decreases. For example, the above-described area may be divided into a first deceleration area and a second deceleration area that is further rearward from the forklift truck 10 than the first deceleration area. If there are some obstacles behind the forklift truck 10, the upper vehicle speed limit and the upper deceleration limit when some of the obstacles are located in the first deceleration area may be lower than the upper vehicle speed limit and the upper deceleration limit when all of the obstacles are located only in the second deceleration area. The distance threshold may be set arbitrarily. For example, the distance threshold is set so that the forklift truck 10 stops before reaching the obstacle if the forklift truck 10 starts to decelerate when the relative distance between the forklift truck 10 and the obstacle reaches the distance threshold.

Vehicle speed limiting and deceleration limiting performed when an obstacle is detected may be performed when the forklift truck 10 travels in a direction in which the obstacle detector 71 detects an obstacle. According to the present embodiment, the obstacle detector 71 detects an obstacle behind the forklift truck 10. Vehicle speed limiting and deceleration limiting corresponding to the position of the obstacle may be performed only when the forklift truck 10 travels rearward. The controller 31 may determine the traveling direction of the forklift truck 10 from the rotational direction of the travel motor 51 or the operating direction of the direction operation member 17.

Vehicle speed limiting and deceleration limiting when an obstacle is detected may be performed when an obstacle is detected on a predicted trajectory of the forklift truck 10. The predicted trajectory of the forklift truck 10 is an expected path of the forklift truck 10 if the forklift truck 10 continues to travel at the current vehicle speed and steering angle. The controller 31 derives the predicted trajectory of the forklift truck 10 in the world coordinate system from the vehicle speed and the steering angle. This allows the controller 31 to determine whether or not the obstacle is located on the predicted trajectory.

The controller 31 may set different values to the upper vehicle speed limit and the upper deceleration limit depending on whether the obstacle is a person or an object excluding humans. For example, the upper vehicle speed limit when the obstacle is a person may be higher than the upper vehicle speed limit when the obstacle is an object excluding humans. For example, the upper deceleration limit when the obstacle is an object excluding humans may be higher than the upper deceleration limit when the obstacle is a person. According to the present embodiment, the upper deceleration limit may be arbitrarily changed by the manufacturer, seller, or operator of the forklift truck 10. For example, the manufacturer, seller, or operator can change the upper deceleration limit by operating the operating device 83. The manufacturer, seller, or operator serves as the user of the present disclosure. The upper deceleration limit may be changed by an external terminal that is connectable to the forklift truck 10.

Figure 4:
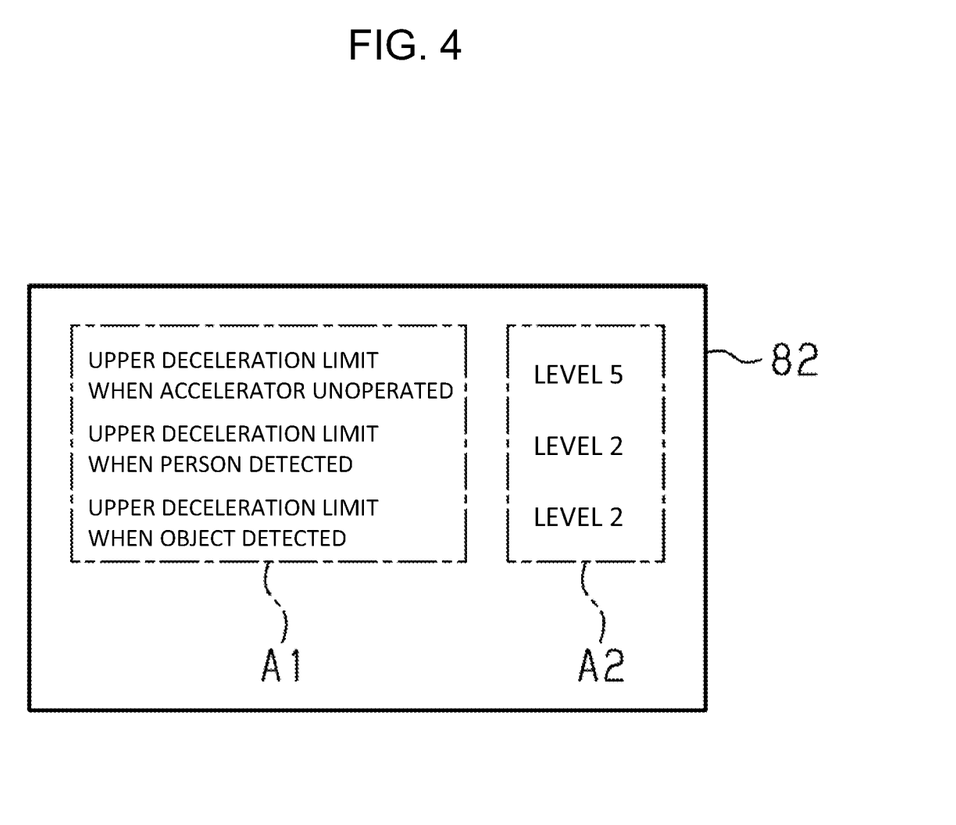
FIG. 4 is a diagram showing an example of a change screen of a display in FIG. 2.

As illustrated in FIG. 4, when the manufacturer, seller, or operator of the forklift truck 10 changes the upper deceleration limit, the display 82 displays a change screen. According to an example illustrated in FIG. 4, the display 82 displays upper deceleration limit indications A1 and those deceleration level indications A2. The indications displayed on the display 82 are updated by the controller 31. The controller 31 may directly control the display 82. When the display unit 81 includes a display controller that controls the display 82, the controller 31 may control the display 82 with the display controller.

The upper deceleration limit indications A1 indicate the upper deceleration limits changeable by operation of the operating device 83. In FIG. 4, the upper deceleration limit indications A1 indicate the upper deceleration limit when an accelerator is unoperated, the upper deceleration limit when a person is detected, and the upper deceleration limit when an object is detected. The upper deceleration limit when an accelerator is unoperated is the upper deceleration limit when the accelerator pedal 16 is not operated. The upper deceleration limit when a person is detected is set for deceleration limiting performed when a person as an obstacle is detected. The upper deceleration limit when an object is detected is set for deceleration limiting performed when an object as an obstacle is detected.

Each of the deceleration level indications A2 indicates a level of the upper deceleration limit indicated by the corresponding upper deceleration limit indication A1. According to the present embodiment, the deceleration level indication A2 indicates the magnitude of the upper deceleration limit. The higher level means the higher upper deceleration limit. The magnitude of the upper deceleration limit assigned to each level is determined in advance. The upper deceleration limit is changed by the user operating the operating device 83. That is, the upper deceleration limit applied to the forklift truck 10 of the present embodiment is changeable in stages by changing the level of the upper deceleration limit. The upper deceleration limit may be changed by inputting a numerical value of the upper deceleration limit. The upper deceleration limit when a person is detected needs to be equal to or lower than the upper deceleration limit when an accelerator is unoperated. The upper deceleration limit when an object is detected needs to be equal to or lower than the upper deceleration limit when an accelerator is unoperated. Accordingly, if the upper deceleration limit when a person is detected is changed to be higher than the upper deceleration limit when an accelerator is unoperated, the upper deceleration limit when a person is detected is capped at the upper deceleration limit when an accelerator is unoperated. If the upper deceleration limit when an object is detected is changed to be higher than the upper deceleration limit when an accelerator is unoperated, the upper deceleration limit when an object is detected is capped at the upper deceleration limit when an accelerator is unoperated. Alternatively, if the upper deceleration limit when an accelerator is unoperated or the upper deceleration limit when a person is detected is changed and the upper deceleration limit when a person is detected becomes higher than the upper deceleration limit when an accelerator is unoperated, the controller 31 may cause the display 82 to display a warning. To display a warning, for example, the display 82 may blink a level indication of the upper deceleration limit when a person is detected or display an error indication. Similarly, if the upper deceleration limit when an object is detected becomes higher than the upper deceleration limit when an accelerator is unoperated, because of the change of the upper deceleration limit when an accelerator is unoperated or the upper deceleration limit when an object is detected, the controller 31 may cause the display 82 to display a warning. The operating device 83 may be operated by the user to change at least one of the upper deceleration limit when an accelerator is unoperated, the upper deceleration limit when a person is detected, and the upper deceleration limit when an object is detected.

Deceleration limiting performed when an obstacle is detected serves as the second deceleration limiting of the present disclosure. The upper deceleration limit set for deceleration limiting performed when an obstacle is detected (i.e., second deceleration limiting) serves as the second upper deceleration limit of the present disclosure. Accordingly, the upper deceleration limit when a person is detected and the upper deceleration limit when an object is detected correspond to the second upper deceleration limit.

When vehicle speed limiting and deceleration limiting are performed because an obstacle is detected, the alarm 74 may alert the operator. The controller 31 may change an alert mode of the alarm 74 depending on whether the detected obstacle is a person or an object excluding humans. The alert mode includes an alert by both the lamp 76 and the buzzer 75, an alert by either the lamp 76 or the buzzer 75, an alert by changing a blinking interval of the lamp 76, and an alert by changing the volume of the sound emitted by the buzzer 75. The controller 31 may change the alert mode depending on the relative distance between the forklift truck 10 and the obstacle.

Vehicle Speed Limiting and Deceleration Limiting Performed when Impact is Applied to Telematics Terminal The following will describe vehicle speed limiting and deceleration limiting performed when an impact is applied to the telematics terminal 40. When an impact is applied to the telematics terminal 40, the controller 31 acquires data indicating the magnitude of the impact from the telematics terminal 40. An upper deceleration limit setting condition on an impact applied to the telematics terminal 40 is defined as a third condition. The controller 31 performs vehicle speed limiting and deceleration limiting if the third condition is satisfied, wherein the third condition is satisfied when the magnitude of the impact applied to the telematics terminal 40 is equal to or greater than a predetermined impact threshold. The impact threshold may be set arbitrarily. For example, an impact large enough to affect the operation of the telematics terminal 40 may be set as the impact threshold. The TCU 41 may determine whether the third condition is satisfied. In this case, the TCU 41 may notify the controller 31 of the satisfaction of the third condition. Deceleration limiting when an impact is applied the telematics terminal 40 serves as the third deceleration limiting of the present disclosure. The upper deceleration limit set for deceleration limiting when an impact is applied to the telematics terminal 40 (i.e., third deceleration limiting) serves as the third upper deceleration limit of the present disclosure. That is, the controller 31 sets the third upper deceleration limit as the set upper deceleration limit, if the third condition is satisfied, to perform third deceleration limiting, wherein the third condition is satisfied when the magnitude of the impact applied to the telematics terminal 40 is equal to or greater than the predetermined impact threshold.

Vehicle Speed Limiting and Deceleration Limiting when Battery Failure is Detected The following will describe vehicle speed limiting and deceleration limiting performed when a failure of the battery 61 is detected. When the monitor 62 detects a failure of the battery 61, the controller 31 acquires data indicating the failure of the battery 61 from the monitor 62. An upper deceleration limit setting condition on a failure of the battery 61 is defined as a fourth condition. The controller 31 performs vehicle speed limiting and deceleration limiting of the forklift truck 10 if the fourth condition is satisfied, wherein the fourth condition is satisfied when a failure of the battery 61 is detected. The deceleration limiting performed when a failure of the battery 61 is detected serves as the fourth deceleration limiting of the present disclosure. The upper deceleration limit set for deceleration limiting performed when a failure of the battery 61 is detected (i.e., fourth deceleration limiting) serves as the fourth upper deceleration limit of the present disclosure. That is, the controller 31 sets the fourth upper deceleration limit as the set upper deceleration limit, if the fourth condition is satisfied, to perform fourth deceleration limiting, wherein the fourth condition is satisfied when the battery 61 fails.

Priority Control

The controller 31 performs various deceleration limiting according to a condition of the forklift truck 10 in the manners previously described. However, some of the first to fourth conditions for deceleration limiting may be satisfied at the same time depending on the condition of the forklift truck 10. For example, both the first condition and the second condition may be satisfied. Since a different upper deceleration limit may be set for each of first deceleration limiting and second deceleration limiting, it is necessary to determine which upper deceleration limit should be preferentially set as the set upper deceleration limit. Accordingly, the controller 31 performs priority control in the following way to determine which upper deceleration limit is preferentially set as the set upper deceleration limit.

Figure 5:
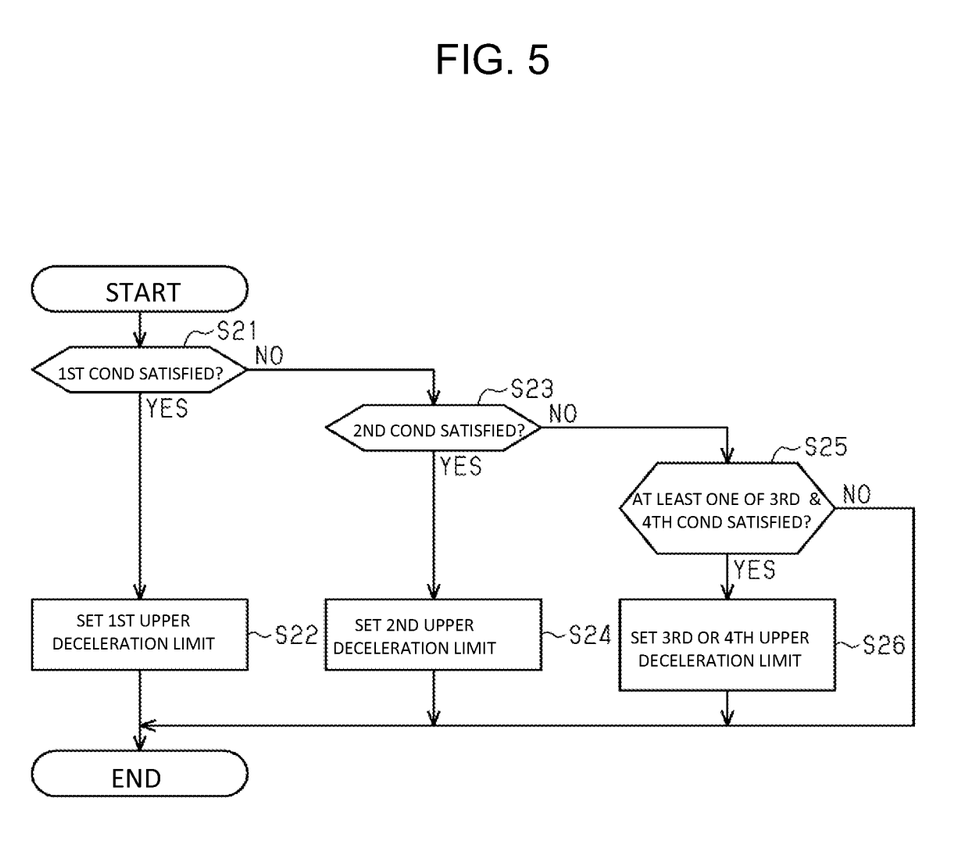
FIG. 5 is a flowchart showing priority control performed by a controller in FIG. 2.

As illustrated in FIG. 5, the controller 31 determines at step S21 whether or not the first condition is satisfied. If the controller 31 determines at step S21 that the first condition is satisfied (YES), the controller 31 performs step S22. If the controller 31 determines at step S21 that the first condition is not satisfied (NO), the controller 31 performs step S23. According to the present embodiment, if at least one of the material handling-related condition and the driver seat-related condition is satisfied, the controller 31 determines at step S21 that the first condition is satisfied.

The controller 31 sets the first upper deceleration limit as the set upper deceleration limit at step S22. If the material handling-related condition is satisfied and the driver seat-related condition is not satisfied, the controller 31 sets the material handling-related upper deceleration limit as the upper deceleration limit at step S22. If the material handling-related condition is not satisfied and the driver seat-related condition is satisfied, the controller 31 sets the empty seat-related upper deceleration limit as the set upper deceleration limit at step S22. In case that both the material handling-related condition and the driver seat-related condition are satisfied, it is necessary to determine in advance which one of the material handling-related upper deceleration limit and the empty seat-related upper deceleration limit the controller 31 will prioritize. If the first condition is satisfied at step S21, the controller 31 performs the priority control to set the first upper deceleration limit as the set upper deceleration limit in preference to the second upper deceleration limit at step S22.

The controller 31 determines at step S23 whether the second condition is satisfied. If the controller 31 determines at step S23 that the second condition is satisfied (YES), the controller 31 performs step S24. If the controller 31 determines at step S23 that the second condition is not satisfied (NO), the controller 31 performs step S25.

The controller 31 sets the second upper deceleration limit as the set upper deceleration limit at step S24. If the second condition is satisfied at step S23, the controller 31 performs the priority control to set the second upper deceleration limit as the set upper deceleration limit in preference to the third upper deceleration limit and the fourth upper deceleration limit at step S24.

The controller 31 determines at step S25 whether at least one of the third condition and the fourth condition is satisfied. If the controller 31 determines at step S25 that at least one of the third condition and the fourth condition is satisfied (YES), the controller 31 performs step S26. If the controller 31 determines at step S25 that the third condition and the fourth condition are not satisfied (NO), the controller 31 ends the priority control.

The controller 31 sets the third upper deceleration limit or the fourth upper deceleration limit as the set upper deceleration limit at step S26. If the third condition is satisfied and the fourth condition is not satisfied, the controller 31 sets the third upper deceleration limit as the set upper deceleration limit. If the third condition is not satisfied and the fourth condition is satisfied, the controller 31 sets the fourth upper deceleration limit as the set upper deceleration limit. In case that both the third condition and the fourth condition are satisfied, it is necessary to determine in advance which one of the third upper deceleration limit and the fourth upper deceleration limit the controller 31 will prioritize.

In the above-described cases, if the first condition is satisfied, the first upper deceleration limit is set as the set upper deceleration limit. If both the first condition and the second condition are satisfied, the controller 31 may set the lower one of the first upper deceleration limit and the second upper deceleration limit as the set upper deceleration limit. If the second upper deceleration limit is changeable, the second upper deceleration limit may be lower than the first upper deceleration limit. In such a case, if both the first condition and the second condition are satisfied, the controller 31 may set the second upper deceleration limit as the set upper deceleration limit. That is, if the first condition is satisfied and the first upper deceleration limit is lower than the second upper deceleration limit, the controller 31 preferentially sets the first upper deceleration limit as the set upper deceleration limit. If the second condition is not satisfied and the first, third, and fourth conditions are satisfied, the controller 31 may set the lowest one of the first, third, and fourth upper deceleration limits as the set upper deceleration limit. The controller 31 preferentially sets the second upper deceleration limit as the set upper deceleration limit if the second condition is satisfied. That is, if the second condition is satisfied, the controller 31 sets the second upper deceleration limit as the set upper deceleration limit regardless of the satisfaction of the third condition and/or the fourth condition.

Operation of Embodiment

In some cases, the second upper deceleration limit may be increased to immediately stop the forklift truck 10 if the second condition is satisfied. The increased second upper deceleration limit allows fast deceleration of the forklift truck 10, so that the forklift truck 10 immediately stops. On the other hand, if the first condition is satisfied, an increase in the first upper deceleration limit is not allowed to prevent fast deceleration of the forklift truck 10. If both the first condition and the second condition are satisfied and the second upper deceleration limit is therefore set as the set upper deceleration limit, fast deceleration may be undesirable in some cases.

If the first condition is satisfied, the controller 31 sets the first upper deceleration limit as the set upper deceleration limit in preference to the second upper deceleration limit. This allows fast deceleration with the second upper deceleration limit if the first condition is not satisfied and the second condition is satisfied, and slow deceleration with the first upper deceleration limit if both the first condition and the second condition are satisfied.

Advantageous Effects of Embodiment (1) The controller 31 sets the first upper deceleration limit as the set upper deceleration limit in preference to the second upper deceleration limit if the first condition is satisfied. This prevents an interference between the first deceleration limiting and the second deceleration limiting.

(2) The first condition includes a condition that the lifting height of the material handling device 20 is equal to or greater than the predetermined lifting height threshold. Slow deceleration of the forklift truck 10 is more required with an increase in the lifting height of the material handling device 20. In this case, the satisfaction of the first condition allows the first upper deceleration limit to be preferentially set if slow deceleration is required.

(3) If the second upper deceleration limit is higher than the upper deceleration limit when an accelerator is unoperated, the controller 31 causes the display 82 to display a warning. If the second condition is satisfied, the controller 31 performs vehicle speed limiting and deceleration limiting (i.e., the second deceleration limiting). The controller 31 may emit an alarm. The operator of the forklift truck 10 releases the accelerator pedal 16 due to the alarm. Releasing the accelerator pedal 16 causes a decrease in the upper deceleration limit if the second upper deceleration limit is higher than the upper deceleration limit when an accelerator is unoperated. This therefore causes slow deceleration of the forklift truck 10 even though the accelerator pedal 16 is released, so that the operator may feel strange operating the forklift truck 10. However, the operator is notified by the warning displayed on the display 82 that the second upper deceleration limit setting is disabled, even if the second upper deceleration limit is higher than the upper deceleration limit when an accelerator is unoperated.

(4) The controller 31 sets the second upper deceleration limit as the set upper deceleration limit in preference to the third upper deceleration limit if both the second condition and the third condition are satisfied. This prevents an interference between the second deceleration limiting and the third deceleration limiting.

(5) The controller 31 sets the second upper deceleration limit as the set upper deceleration limit in preference to the fourth upper deceleration limit if the second condition and the fourth condition are satisfied. This prevents an interference between the second deceleration limiting and the fourth deceleration limiting.

Modification

The present embodiment may be modified and implemented as follows. The present embodiment and the following modifications may be implemented in combination with each other within a technically consistent range.

The controller 31 does not necessarily have to perform vehicle speed limiting and deceleration limiting when a failure of the battery 61 is detected.

The controller 31 does not necessarily have to perform vehicle speed limiting and deceleration limiting when an impact is applied to the telematics terminal 40.

The controller 31 does not necessarily have to cause the display 82 to display a warning even if the second upper deceleration limit is higher than the upper deceleration limit when an accelerator is unoperated. The controller 31 may cause a device to emit a warning sound instead of displaying a warning.

The second upper deceleration limit may not be changeable.

The controller 31 may perform only one of deceleration limiting based on the condition of the material handling device 20 and deceleration limiting when the empty driver seat is detected.

When the controller 31 performs vehicle speed limiting and deceleration limiting according to the lifting height of the material handling device 20, the controller 31 may decrease the upper vehicle speed limit continuously or in stages as the lifting height increases. The controller 31 may decrease the upper deceleration limit continuously or in stages as the lifting height increases.

The material handling-related condition may be satisfied when the weight of the material L equal to or greater than the weight threshold is detected regardless of the lifting height of the material handling device 20.

The obstacle detector 71 may include a monocular camera, a time of flight (ToF) camera, a laser imaging detection and ranging (LiDAR) sensor, or a millimeter-wave radar, instead of the stereo camera 72. The obstacle detector 71 may include a combination of sensors, such as the stereo camera 72 and the LiDAR sensor.

The alarm 74 may be a component of a device other than the obstacle detector 71.

The alarm 74 may be directly operated by the controller 31.

The vehicle speed of the forklift truck 10 may be changeable according to the operation amount of the direction operation member 17. In this case, an upper deceleration limit when the direction operation member 17 is unoperated is applied instead of the upper deceleration limit when an accelerator is unoperated.

A towing tractor may serve as the industrial vehicle of the present disclosure. In this case, the satisfaction of the first condition is determined by detecting the empty driver seat.

The following will describe technical ideas that can be understood from the above-described embodiment and the modifications.

[Aspect 1] An industrial vehicle includes: a controller configured to decelerate the industrial vehicle at a deceleration equal to or lower than a set upper deceleration limit; and an obstacle detector configured to detect a relative distance between the industrial vehicle and an obstacle, wherein the controller sets a first upper deceleration limit as the set upper deceleration limit, if a first condition is satisfied, to perform first deceleration limiting, wherein the first condition is satisfied when at least one of a high lifting height of the industrial vehicle equal to or greater than a lifting height threshold, a weight of a material equal to or greater than a weight threshold, and an empty driver seat is detected; sets a second upper deceleration limit as the set upper deceleration limit, if a second condition is satisfied, to perform second deceleration limiting, wherein the second condition is satisfied when the relative distance between the industrial vehicle and the obstacle is less than a predetermined distance threshold; and performs priority control if both the first condition and the second condition are satisfied so that the first upper deceleration limit is set as the set upper deceleration limit in preference to the second upper deceleration limit.

[Aspect 2] The industrial vehicle according to aspect 1, wherein the industrial vehicle includes a material handling device, and the first condition includes that the lifting height of the material handling device is equal to or greater than the predetermined lifting height threshold, which is predetermined.

[Aspect 3] The industrial vehicle according to aspect 1 or 2, wherein the industrial vehicle includes: a display; and an operating device operated by a user to change at least one of the second upper deceleration limit and an upper deceleration limit when an accelerator is unoperated, and the controller causes the display to display a warning if the second upper deceleration limit is higher than the upper deceleration limit when the accelerator is unoperated.

[Aspect 4] The industrial vehicle according to any one of aspects 1 to 3, wherein the industrial vehicle includes a telematics terminal, the controller sets a third upper deceleration limit as the set upper deceleration limit, if a third condition is satisfied, to perform third deceleration limiting, wherein the third condition is satisfied when a magnitude of an impact applied to the telematics terminal is equal to or greater than a predetermined impact threshold, and the priority control includes setting the second upper deceleration limit as the set upper deceleration limit in preference to the third upper deceleration limit if both the second condition and the third condition are satisfied.

[Aspect 5] The industrial vehicle according to any one of aspects 1 to 4, wherein the industrial vehicle includes a battery, the controller sets a fourth upper deceleration limit as the set upper deceleration limit, if a fourth condition is satisfied, to perform fourth deceleration limiting, wherein the fourth condition is satisfied when the battery fails, and the priority control includes setting the second upper deceleration limit as the set upper deceleration limit in preference to the fourth upper deceleration limit if both the second condition and the fourth condition are satisfied.

What is claimed is:
1. An industrial vehicle comprising:
a controller configured to decelerate the industrial vehicle at a deceleration equal to or lower than a set upper deceleration limit;

an obstacle detector configured to detect a relative distance between the industrial vehicle and an obstacle;
a lifting height sensor configured to detect a lifting height of a material handling device of the industrial vehicle;
a load sensor configured to determine a weight of a material loaded on the material handling device; and
a seat switch that indicates whether or not an operator is seated in a driver seat of the industrial vehicle, wherein the controller
- determines whether the lifting height is equal to or greater than a lifting height threshold based on a signal received from the lifting height sensor;
- determines whether the weight of the material is equal to or greater than a weight threshold based on a signal received from the load sensor;
- determines whether or not an operator is seated in the driver seat based on a signal received from the seat switch;
- sets a first upper deceleration limit as the set upper deceleration limit to perform first deceleration limiting, if a first condition is satisfied, wherein the first condition is satisfied when at least one of the lifting height of the industrial vehicle is equal to or greater than the lifting height threshold, the weight of the material is equal to or greater than a weight threshold, and an empty driver seat is detected based on the signal from the seat switch;
- sets a second upper deceleration limit as the set upper deceleration limit to perform second deceleration limiting, if a second condition is satisfied, wherein the second condition is satisfied when the relative distance between the industrial vehicle and the obstacle is less than a predetermined distance threshold; and
- based upon both the first condition and the second condition being satisfied, performs priority control so that the first upper deceleration limit is set as the set upper deceleration limit in preference to the second upper deceleration limit.

2. The industrial vehicle according to claim 1, wherein the industrial vehicle includes:

a display; and
an operating device operated by a user to change at least one of the second upper deceleration limit and an upper deceleration limit when an accelerator is unoperated, and
the controller causes the display to display a warning if the second upper deceleration limit is higher than the upper deceleration limit when the accelerator is unoperated.

3. The industrial vehicle according to claim 1, wherein the industrial vehicle includes a telematics terminal,
the controller sets a third upper deceleration limit as the set upper deceleration limit, if a third condition is satisfied, to perform third deceleration limiting, wherein the third condition is satisfied when a magnitude of an impact applied to the telematics terminal is equal to or greater than a predetermined impact threshold, and
the priority control includes setting the second upper deceleration limit as the set upper deceleration limit in preference to the third upper deceleration limit if both the second condition and the third condition are satisfied.

4. The industrial vehicle according to claim 1, wherein the industrial vehicle includes a battery,
the controller sets a fourth upper deceleration limit as the set upper deceleration limit, if a fourth condition is satisfied, to perform fourth deceleration limiting, wherein the fourth condition is satisfied when the battery fails, and
the priority control includes setting the second upper deceleration limit as the set upper deceleration limit in preference to the fourth upper deceleration limit if both the second condition and the fourth condition are satisfied.

5. The industrial vehicle according to claim 1, wherein the first condition is satisfied when (i) the empty seat condition is detected, and (ii) at least one of the lifting height of the industrial vehicle is equal to or greater than the lifting height threshold and the weight of the material is equal to or greater than the weight threshold.

* * * * *